US012143249B2

United States Patent
Weng et al.

(10) Patent No.: US 12,143,249 B2
(45) Date of Patent: Nov. 12, 2024

(54) ERROR DETECTION AND CORRECTION DEVICE CAPABLE OF DETECTING HEAD POSITION OF SUSPICIOUS ERROR AND PERFORMING FORWARD ERROR PROPAGATION PATH TRACKING FOR PROVIDING INFORMATION NEEDED BY FOLLOW-UP ERROR CORRECTION AND ASSOCIATED METHOD

(71) Applicant: MEDIATEK INC., Hsin-Chu (TW)

(72) Inventors: Deng-Fu Weng, Hsinchu (TW); Yu-Ting Liu, Hsinchu (TW); Che-Yu Chiang, Hsinchu (TW); Chung-Hsien Tsai, Hsinchu (TW); Huai-Mao Weng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/116,314

(22) Filed: Mar. 2, 2023

(65) Prior Publication Data
US 2023/0308322 A1 Sep. 28, 2023

Related U.S. Application Data

(60) Provisional application No. 63/323,118, filed on Mar. 24, 2022.

(51) Int. Cl.
*H04L 25/06* (2006.01)
*H04L 1/00* (2006.01)
*H04L 25/03* (2006.01)
(52) U.S. Cl.
CPC .......... *H04L 25/061* (2013.01); *H04L 1/0013* (2013.01); *H04L 25/03267* (2013.01)

(58) Field of Classification Search
CPC ................. H04L 25/061; H04L 1/0013; H04L 25/03267; H04L 25/03254; H04L 25/08; H04L 25/03949
See application file for complete search history.

(56) References Cited

U.S. PATENT DOCUMENTS

| | | |
|---|---|---|
| 10,404,289 B1 | 9/2019 | Riani |
| 10,637,512 B2 | 4/2020 | Riani |
| 11,038,538 B2 | 6/2021 | Riani |
| 11,218,246 B2 | 1/2022 | Lu |
| 2008/0115041 A1 | 5/2008 | Park |

(Continued)

FOREIGN PATENT DOCUMENTS

EP 3 713 167 A1 9/2020

*Primary Examiner* — Khanh C Tran
(74) *Attorney, Agent, or Firm* — Winston Hsu

(57) ABSTRACT

An error detection and correction device includes a decision-feedback equalizer (DFE), a decision circuit, an error detection circuit, and an error correction circuit. The DFE equalizes a data signal to generate a first equalized signal. The decision circuit performs hard decision upon the first equalized signal to generate a symbol decision signal. The error detection circuit performs forward error detection at symbol positions of consecutive symbols included in the symbol decision signal to detect a head position of suspicious error that affects at least one symbol in the symbol decision signal. The error correction circuit performs error correction upon the symbol decision signal in response to the head position of the suspicious error that is detected by the error detection circuit.

20 Claims, 7 Drawing Sheets

(56) References Cited

U.S. PATENT DOCUMENTS

| | | | |
|---|---|---|---|
| 2009/0268802 A1* | 10/2009 | Wang | H04L 25/03057 |
| | | | 375/233 |
| 2013/0308694 A1* | 11/2013 | Amamiya | H04B 7/005 |
| | | | 375/233 |
| 2016/0028562 A1* | 1/2016 | Dallaire | H04L 25/03019 |
| | | | 375/233 |
| 2019/0372607 A1 | 12/2019 | Riani | |
| 2020/0295871 A1* | 9/2020 | Lu | H04L 25/03203 |
| 2021/0218604 A1* | 7/2021 | Wu | H04L 25/03885 |
| 2023/0118769 A1 | 4/2023 | Liu | |

* cited by examiner (A)

(B)

(C)

ERROR DETECTION AND CORRECTION DEVICE CAPABLE OF DETECTING HEAD POSITION OF SUSPICIOUS ERROR AND PERFORMING FORWARD ERROR PROPAGATION PATH TRACKING FOR PROVIDING INFORMATION NEEDED BY FOLLOW-UP ERROR CORRECTION AND ASSOCIATED METHOD

CROSS REFERENCE TO RELATED APPLICATIONS

This application claims the benefit of U.S. Provisional Application No. 63/323,118, filed on Mar. 24, 2022. The content of the application is incorporated herein by reference.

BACKGROUND

The present invention relates to data communications, and more particularly, to an error detection and correction device capable of detecting a head position of suspicious error and performing forward error propagation path tracking for providing information needed by follow-up error correction and an associated method.

In high speed data communication systems, existing filtering and equalization schemes may not be enough to support challenging channels and next-generation Ethernet. For example, the detection of the received signal in a data communication system is challenging due to several factors such as noise, cross-talk, and inter-symbol interference (ISI). A typical decision-feedback equalizer (DFE) can remove the post-cursor ISI by using one or more previous symbols (e.g., one or more previous hard decisions). However, error propagation may be induced by the typical DFE due to the feedback characteristic that relies on previous hard decision(s). Maximum likelihood sequence detection (MLSD) is a commonly used technique which utilizes and further removes the ISI to deal with noise. However, MLSD has a higher level of implementation complexity and a higher level of power and memory consumption. In some high-speed Ethernet standards, a simple way called 1+D precoding can use inter-symbol information of DFE to eliminate DFE error propagation. However, it needs a precoding engine in the transmit (TX) side and a deprecoding engine in the receive (RX) side. In addition, it causes an additional error after the error propagation terminates, and is unable to eliminate the first random error. Thus, there is a need for a low-cost error eliminator which utilizes inter-symbol information of DFE to compensate not only the propagated errors but also the first random error.

SUMMARY

One of the objectives of the claimed invention is to provide an error detection and correction device capable of detecting a head position of suspicious error and performing forward error propagation path tracking for providing information needed by follow-up error correction and an associated method.

According to a first aspect of the present invention, an exemplary error detection and correction device is disclosed. The exemplary error detection and correction device includes a decision-feedback equalizer (DFE), a decision circuit, an error detection circuit, and an error correction circuit. The DFE is configured to equalize a data signal to generate a first equalized signal. The decision circuit is configured to perform hard decision upon the first equalized signal to generate a symbol decision signal. The error detection circuit is configured to perform forward error detection at symbol positions of consecutive symbols included in the symbol decision signal to detect a head position of suspicious error that affects at least one symbol in the symbol decision signal. The error correction circuit is configured to perform error correction upon the symbol decision signal in response to the head position of the suspicious error that is detected by the error detection circuit.

According to a second aspect of the present invention, an exemplary error detection and correction method is disclosed. The exemplary error detection and correction method includes: performing decision-feedback equalization upon a data signal to generate a first equalized signal; performing hard decision upon the first equalized signal to generate a symbol decision signal; performing forward error detection at symbol positions of consecutive symbols included in the symbol decision signal to detect a head position of suspicious error that affects at least one symbol in the symbol decision signal; and performing error correction upon the symbol decision signal in response to the head position of the suspicious error.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include"

and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
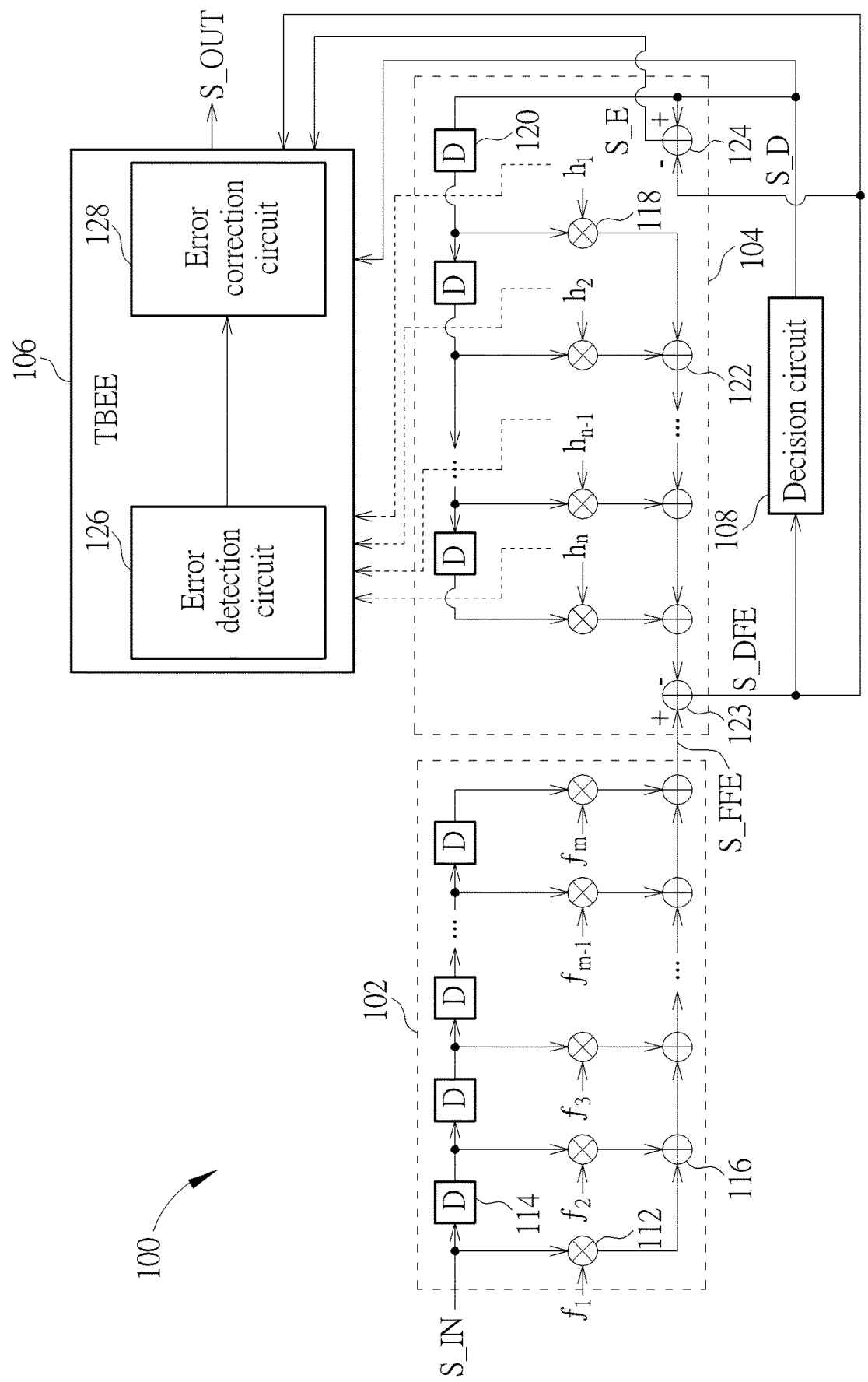
FIG. 1 is a diagram illustrating an error detection and correction device according to an embodiment of the present invention.

FIG. 1 is a diagram illustrating an error detection and correction device according to an embodiment of the present invention. The error detection and correction device 100 may be a part of a receiver in a data communication system. In this embodiment, the error detection and correction device 100 is a digital circuit, including a feed-forward equalizer (FFE) 102, a decision-feedback equalizer (DFE) 104, a trellis-based error eliminator (TBEE) 106, and a decision circuit 108. It should be noted that only the components pertinent to the present invention are illustrated in FIG. 1. In practice, the error detection and correction device 100 is allowed to include additional components for other designated functions. The FFE 102 may be implemented by an m-tap FFE having m multipliers 112, (m−1) delay elements 114, and (m−1) adders 116, where m FFE coefficients $f_1$-$f_m$ (m≥1) are applied to the m multipliers 112, respectively. However, this is for illustrative purposes only, and is not meant to be a limitation of the present invention. In practice, any suitable FFE structure may be employed by the FFE 102. That is, the present invention has no limitations on the FFE design. The FFE 102 is configured to process a received signal S_IN to generate an equalized signal S_FFE as a data signal to be processed by the following DFE 104. For example, a pulse-amplitude modulation (PAM) signal is generated and transmitted from a transmitter of the data communication system to the receiver of the data communication system via a channel, and the received signal S_IN is a digital signal derived from the PAM signal. Taking 4-level PAM (PAM4) signaling for example, there are four symbols {−3, −1, +1, +3}, and each symbol corresponds to a pair of two bits. For example, four bit choices 00, 01, 11, and 10 may be associated with amplitudes of −3, −1, +1, and +3, respectively. It should be noted that the FFE 102 may be optional, depending upon actual design considerations.

The DFE 104 is configured to equalize a data signal derived from the received signal S_IN, such as equalized signal S_FFE output from FFE 102 to act as an input signal of DFE 104, to generate an equalized signal S_DFE. The DFE 104 may be implemented by an n-tap DFE having n multipliers 118, (n−1) delay elements 120, (n−1) adders 122, and a plurality of combining circuits 123, 124, where n DFE coefficients $h_1$-$h_n$ (n≥1) are applied to the n multipliers 118, respectively. However, this is for illustrative purposes only, and is not meant to be a limitation of the present invention. In practice, any suitable DFE structure may be employed by the DFE 104. That is, the present invention has no limitations on the DFE design.

The combining circuit 123 within the DFE 104 is configured to combine the data signal (e.g., equalized signal S_FFE obtained from equalizing the received signal S_IN) and a signal output of the last-stage adder 122 to generate the equalized signal S_DFE that includes a plurality of samples (soft data). For example, the combining circuit 123 may be implemented by a subtractor (which may be realized by an adder configured to perform subtraction).

The decision circuit 108 is configured to perform hard decision upon the equalized signal S_DFE to generate the symbol decision signal S_D that includes a plurality of symbols (hard data). For example, the decision circuit 108 may be a slicer. In a case where the received signal S_IN is derived from PAM4 signaling, each of the equalized signals S_FFE and S_DFE carries soft data, and the symbol decision signal S_D carries hard data (i.e., symbols each being decided by the slicer to be one of four symbols {−3, −1, +1, +3}). The symbol decision signal S_D is fed back to the DFE 104. Specifically, (n−1) previous symbols output from the decision circuit 108 are stored in the (n−1) delay elements 120, and are used for equalizing a current sample included in the data signal (e.g., equalized signal S_FFE obtained from equalizing the received signal S_IN).

In this embodiment, the combining circuit 124 within the DFE 104 is configured to combine the equalized signal S_DFE and the symbol decision signal S_D to generate an error signal S_E. For example, the combining circuit 124 may be implemented by a subtractor (which may be realized by an adder configured to perform subtraction) for outputting difference between the equalized signal S_DFE and the symbol decision signal S_D (particularly, difference between each sample (soft data) included the equalized signal S_DFE and a corresponding symbol (hard data) included in the symbol decision signal S_D) as the error signal S_E. It should be noted that the combining circuit 124 may be optional, depending upon actual design considerations.

The TBEE 106 is configured to eliminate errors introduced to the symbols included in the symbol decision signal S_D due to the feedback characteristic of DFE. In this embodiment, the TBEE 106 includes an error detection circuit 126 and an error correction circuit 128, and may operate according to at least one of DFE coefficient (e.g., $h_1$-$h_n$, where n≥1), equalized signal S_DFE, symbol decision signal S_D, and error signal S_E. The error detection circuit 126 is configured to perform forward error detection at symbol positions of consecutive symbols included in the symbol decision signal S_D to detect a head position of suspicious error that affects at least one symbol in the symbol decision signal S_D. For example, the suspicious error detected by the error detection circuit 126 may be a single error that affects only a single symbol included in the symbol decision signal S_D. That is, the error occurring at a current symbol is not propagated to a next symbol via the feedback characteristic of DFE, and a propagation length is equal to a zero value, meaning that a tail position of the suspicious error is the same as the head position of the suspicious error. For another example, the suspicious error detected by the error detection circuit 126 is a burst error that affects a series of symbols included in the symbol decision signal S_D. That is, the error occurring at a current symbol is propagated to following symbols via the feedback characteristic of DFE, and a propagation length is equal to a non-zero value, meaning that a tail position of the suspicious error is different from the head position of the suspicious error.

The error correction circuit 128 is configured to perform error correction upon the symbol decision signal S_D in response to the head position of the suspicious error that is detected by the error detection circuit 126, and generate a final symbol sequence S_OUT. For PAM4 signaling, the final symbol sequence S_OUT is a sequence of symbols each being one of four symbols {−3, −1, +1, +3}, and includes corrected symbols generated at the TBEE 106. For example, the error correction circuit 128 is configured to perform forward error propagation path tracking that starts from the head position detected by the error detection circuit 126, for selecting an error propagation path with a propagation length (which may be a zero value or a non-zero value); and information of the propagation length is referenced by the error correction circuit 128 for performing the error correction upon the symbol decision signal S_D.

Since the present invention is focused on the proposed error detection and correction technique employed by TBEE 106 and a person skilled in the art should readily understand principles of FFE 102, DFE 104, and decision circuit 108, further description of FFE 102, DFE 104, and decision circuit 108 is omitted here for brevity.

Figure 2:
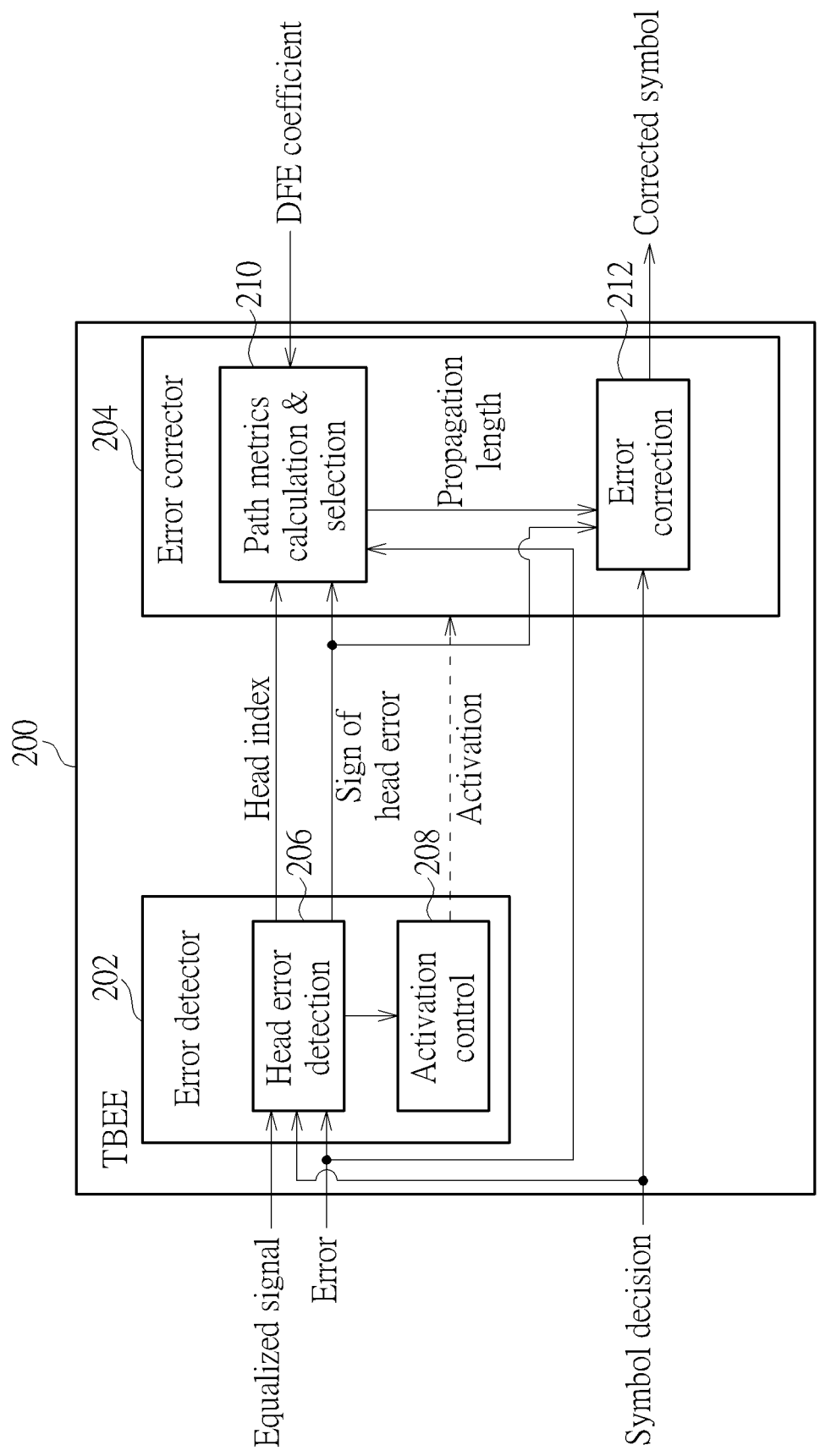
FIG. 2 is a diagram illustrating a TBEE according to an embodiment of the present invention.
Figure 3:
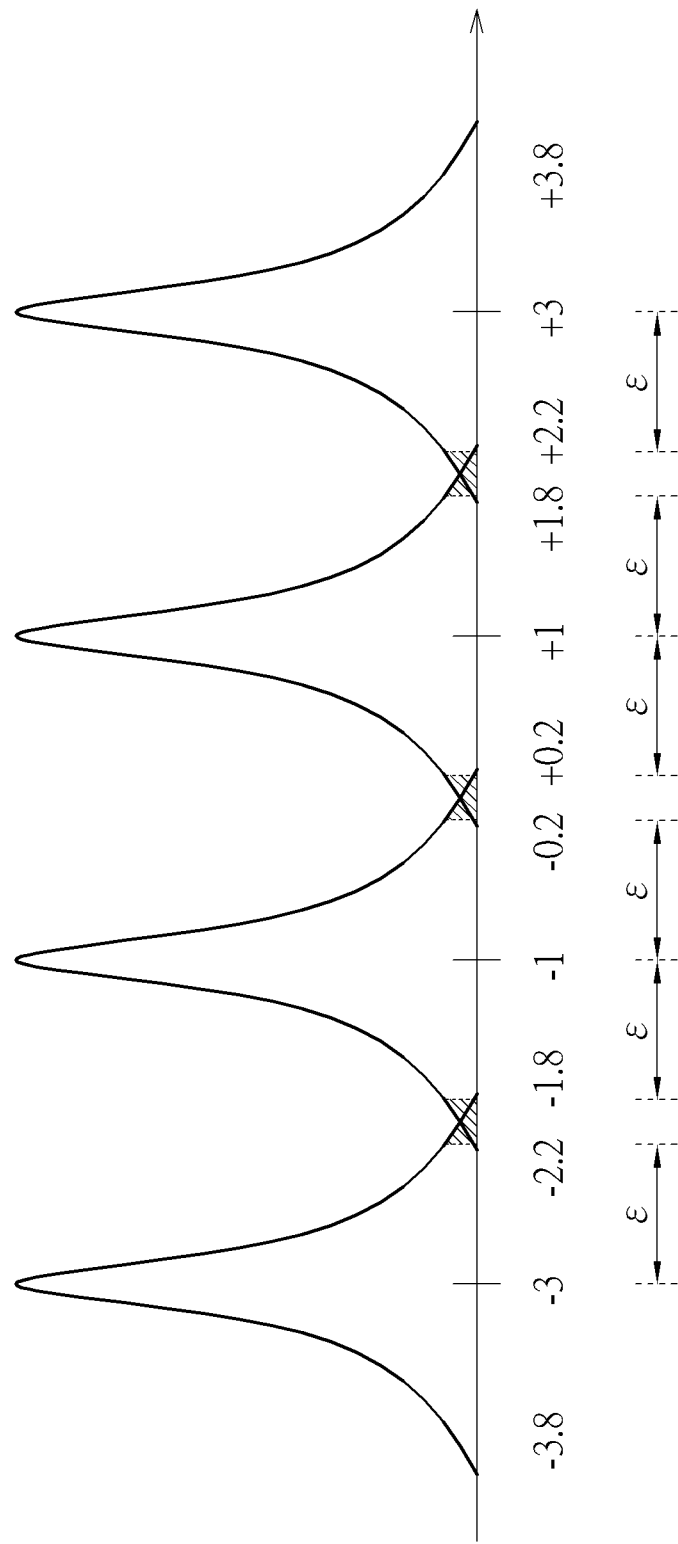
FIG. 3 is a diagram illustrating distribution of samples that are transmitted via an AWGN channel.

FIG. 2 is a diagram illustrating a TBEE according to an embodiment of the present invention. The TBEE 200 includes an error detector 202 and an error corrector 204. The TBEE 106 shown in FIG. 1 may be implemented by the TBEE 200 shown in FIG. 2, where the error detection circuit 126 may be implemented by the error detector 202, and the error correction circuit 128 may be implemented by the error corrector 204. The error detector 202 includes circuits for supporting a plurality of functions, including a head error detection function 206 and an activation control function 208. The error corrector 204 includes circuits for supporting a plurality of functions, including a path metrics calculation & selection function 210 and an error correction function 212. The head error detection function 206 is configured to deal with detection of a head position of suspicious error, that is, a symbol position of a head error. In this embodiment, the head error detection function 206 sets an error threshold ε, and finds a candidate head error (which may be a single random error that affects only a single symbol or a first random error at the beginning of a burst error/error propagation that affects consecutive symbols) according to the error threshold E. In this embodiment, the head error detection function 206 can perform head detection according to difference between the equalized signal S_DFE and the symbol decision signal S_D. In a case where the error signal S_E is available to the error detector 202, the head error detection function 206 can refer to the error signal S_E to perform head detection upon symbol positions of consecutive symbols in a forward direction. That is, the head error detection function 206 can perform forward error detection upon symbol positions according to difference between the equalized signal S_DFE and the symbol decision signal S_D. For example, the equalized signal S_DFE may carry one sample (soft data) $s_i$ for each symbol position i, and the decision circuit 108 may perform hard decision upon the sample $s_i$ to generate one symbol (hard data) $d_i$ for the same symbol position i. The head error detection function 206 performs head detection upon a current symbol position i by checking multiple conditions. The first condition is checked to determine if an absolute difference $|s_{i-1}-d_{i-1}|$ between a previous sample $s_{i-1}$ and a previous symbol $d_{i-1}$ is not larger than a predetermined threshold (i.e., |previous slicer error|≤ε). The second condition is checked to determine if an absolute difference $|s_i-d_i|$ between the current sample $s_i$ and the current symbol $d_i$ is larger than the predetermined threshold (i.e., |current slicer error|>ε). The third condition is checked to determine if an absolute value of the current sample $s_i$ is smaller than a maximum PAM level (i.e., |soft data|<maximum PAM level). For better comprehension of technical features of the proposed error detection and correction technique, the following takes PAM4 and 1-tap DFE as an example. In practice, the proposed error detection and correction technique can be applied to a PAM-x (x≥2) receiver with an n-tap DFE (n>1). FIG. 3 is a diagram illustrating distribution of samples that are transmitted via an additive white Gaussian noise (AWGN) channel. Suppose that the error threshold ε is set by 0.8. When the absolute difference $|s_{i-1}-d_{i-1}|$ is not larger than 0.8 and the absolute difference $|s_i-d_i|$ is larger than 0.8, it is possible that symbol decision of the current symbol $d_i$ at the decision circuit 108 suffers from a head error. That is, the correct symbol transmitted from a transmitter at the current symbol position i may have a symbol value adjacent to a symbol value of the current symbol $d_i$ erroneously decided by hard decision of the sample $s_i$ with soft data shifted by the head error. In a case where |e[0]|=|$d_{i-1}-s_{i-1}$|≤0.8 is met, a head error may be found if there exists soft data that lies in the shaded regions due to |e[1]|=|$d_i-s_i$|>0.8, as illustrated in FIG. 3. It should be noted that, if the soft data is larger than +3, the correct symbol {+3} can still be decided, and if the soft data is smaller than −3, the correct symbol {−3} can still be decided. Hence, when the current sample $s_i$ with soft data larger than +3 or smaller than −3, the current symbol $d_i$ may be regarded as an error-free symbol. Hence, the third condition (i.e., |soft data|<maximum PAM level) is checked to avoid misdetection of the head error.

When the first condition, the second condition, and the third condition are all met at the current symbol position i, the head error detection function 206 determines that a head error occurs at the current symbol position i, which implies that the current symbol $d_i$ at the current symbol position i needs error correction. The head error detection function 206 provides a head index to the error corrector 204 (particularly, path metrics calculation & selection function 210 of error corrector 204) for indicating the head position of suspicious error. In addition, the head error detection function 206 also provides sign s of the head error (i.e., s=sign(e[1])=sign($d_i-s_i$)) to the error corrector 204. For example, the sign s of the head error may be used by path metric calculation. For another example, the sign s of the head error may be used for determining an error pattern that is caused by 1-tap DFE and starts from the detected head position.

The activation control function 208 is configured to control activation of the error corrector 204 during a period in which the head error detection function 206 is operative to perform head detection upon symbol positions of consecutive symbols in a forward direction. For example, the error corrector 204 is activated in response to a head error being detected by the head error detection function 206. That is, the error corrector 204 is only activated when the head error is detected by the head error detection function 206. Since there is no need to start an error correction procedure in the absence of a detected head error, the activation control function 208 may deactivate the error corrector 204 for power consumption reduction. In addition, the activation control function 208 may deactivate the error corrector 204 at the end of an error correction procedure that is activated due to a detected head error. In this way, power consumption of TBEE 200 can be quite low to meet the requirement of a low-power receiver. However, this is for illustrative purposes only, and is not meant to be a limitation of the present invention. In some embodiments of the present invention, the error detector 202 may be modified to omit the activation control function 208. This alternative design also falls within the scope of the present invention.

After a head error is detected by the head error detection function 206, the path metrics calculation & selection function 210 of the error corrector 204 is operative to perform forward error propagation path tracking for selecting an error propagation path with a propagation length, and provide information of the propagation length to the error correction function 212. For example, the forward error propagation path tracking may be performed based on a two-state trellis.

Figure 4:
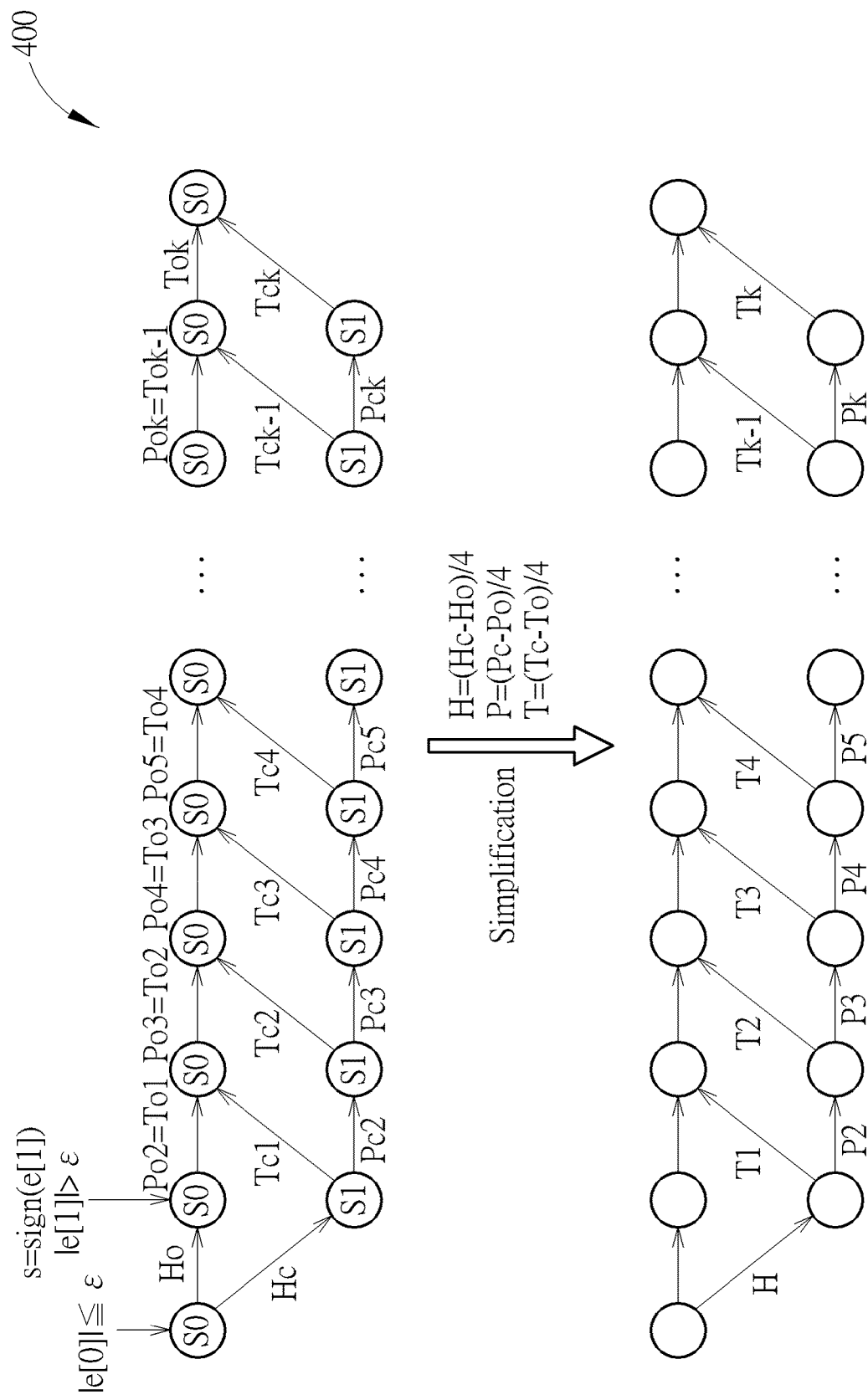
FIG. 4 is a diagram illustrating a two-state trellis used for error propagation path selection according to an embodiment of the present invention.
Figure 5:
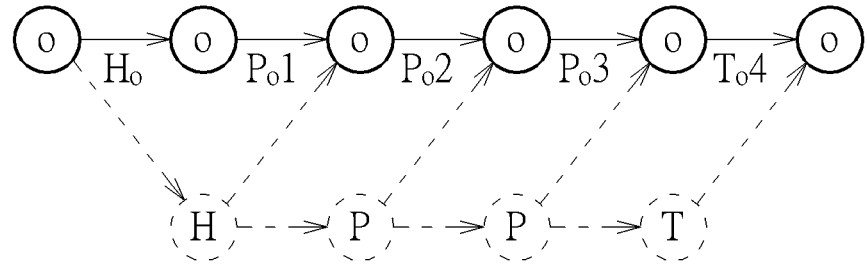
FIG. 5 is a diagram illustrating an original path and a plurality of candidate paths according to an embodiment of the present invention.
Figure 5:
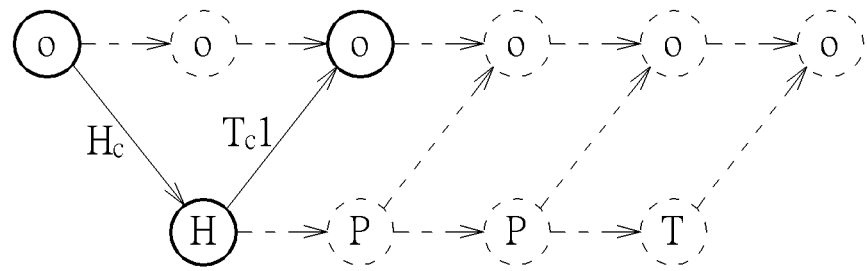
Figure 5:
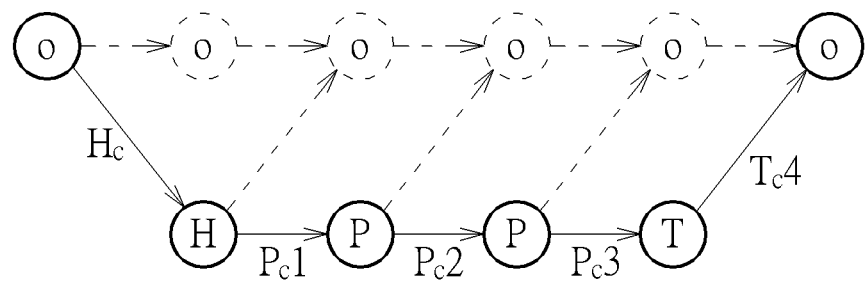

FIG. 4 is a diagram illustrating a two-state trellis used for error propagation path selection according to an embodiment of the present invention. The top part of FIG. 4 shows a two-state trellis 400 that starts from a data state S0 of an error-free symbol with |e[0]|≤ε. A path without any state transition is regarded as an original path corresponding to a symbol sequence output from the decision circuit 108. A path with one state transition from S0 to S1 and another state transition from S1 to S0 may be regarded as a candidate path for error propagation path selection. For example, a candidate path j is a path corresponding to a sequence that starts from the data state S1 of the detected head error, propagates (j−1) data states each being the same data state S1, and ends at the $j^{th}$ data state (which is the data state S0). FIG. 5 is a diagram illustrating an original path and a plurality of candidate paths according to an embodiment of the present invention. The sub-diagram (A) of FIG. 5 shows an original path with branch metrics $H_o$, $P_o1$, $P_o2$, $P_o3$, $T_o4$. The sub-diagram (B) of FIG. 5 shows a candidate path 1 (j=1) with branch metrics $H_c$ and $T_c1$. The sub-diagram (C) of FIG. 5 shows a candidate path 4 (j=4) with branch metrics $H_c$, $P_c1$, $P_c2$, $P_c3$, and $T_c4$.

Figure 6:
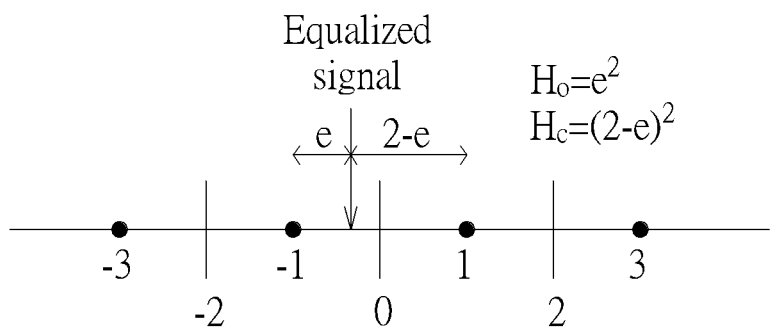
FIG. 6 is a diagram illustrating a concept of calculating branch metrics of head branches according to an embodiment of the present invention.

FIG. 6 is a diagram illustrating a concept of calculating branch metrics of head branches according to an embodiment of the present invention. The branch metric $H_o$ of the original path and the branch metric $H_c$ of the candidate path can be calculated using the following formulas.

$$H_o = e^2[1] \quad (1)$$

$$H_c = \begin{cases} (e[1] - 2)^2, & e[1] > 0 \\ (e[1] + 2)^2, & e[1] < 0 \end{cases} = e^2[1] \mp 4e[1] + 4 = e^2[1] - 4 \cdot \text{abs}(e[1]) + 4 \quad (2)$$

The difference between the branch metrics $H_c$ and $H_o$ can be represented by a new branch metric H calculated using the following formula.

$$H = \frac{H_c - H_o}{4} = -\text{abs}(e[1]) + 1 \quad (3)$$

Figure 7:
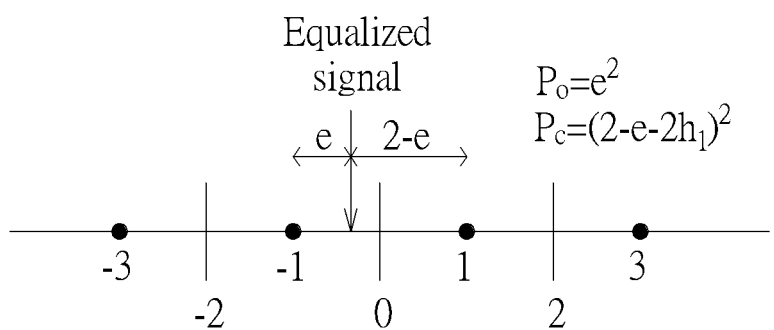
FIG. 7 is a diagram illustrating a concept of calculating branch metrics of the $k^{th}$ propagation branches according to an embodiment of the present invention.

FIG. 7 is a diagram illustrating a concept of calculating branch metrics of the $k^{th}$ propagation branches according to an embodiment of the present invention. The branch metric $P_o[k]$ of the original path and the branch metric $P_c[k]$ of the candidate path can be calculated using the following formulas.

$$P_o[k] = e^2[k] \quad (4)$$

$$P_c[k] = \quad (5)$$

$$\begin{cases} (e[k] - 2 + 2h_1)^2, & e[1] > 0 \text{ and } k \text{ is odd}) \text{ or } (e[1] < 0 \text{ and } k \text{ is even}) \\ (e[k] + 2 - 2h_1)^2, & (e[1] < 0 \text{ and } k \text{ is odd}) \text{ or } (e[1] > 0 \text{ and } k \text{ is even}) \end{cases}$$

$$= (e[k] + s \cdot (-1)^k \cdot 2 \cdot (1 - h_1))^2$$

$$= e^2[k] + 4 \cdot s \cdot (-1)^k \cdot e[k] \cdot (1 - h_1) + 4(1 - h_1)^2$$

The term $2h_1$ represents an error caused by 1-tap DFE error propagation. The difference between the branch metrics $P_c[k]$ and $P_o[k]$ can be represented by a new branch metric P[k] calculated using the following formula.

$$P[k] = \frac{P_c[k] - P_o[k]}{4} = s \cdot (-1)^k \cdot e[k] \cdot (1 - h_1) + (1 - h_1)^2, \text{ for } k = 2, 3, \quad (6)$$

Figure 8:
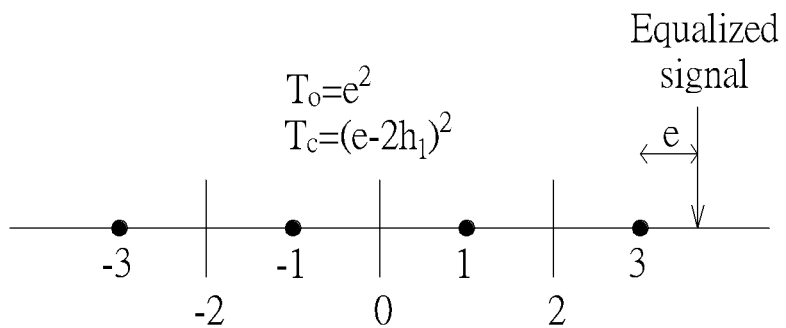
FIG. 8 is a diagram illustrating a concept of calculating branch metrics of the $k^{th}$ tail branches according to an embodiment of the present invention.

FIG. 8 is a diagram illustrating a concept of calculating branch metrics of the $k^{th}$ tail branches according to an embodiment of the present invention. As mentioned above, if the soft data is larger than +3, the correct symbol {+3} can still be decided, and if the soft data is smaller than −3, the correct symbol {−3} can still be decided. Hence, the error propagation is terminated when an absolute value of the soft data is larger than the maximum PAM level. The branch metric $T_o[k]$ of the original path and the branch metric $T_c[k]$ of the candidate path can be calculated using the following formulas.

$$T_o[k] = P_o[k+1] = e^2[k+1] \quad (7)$$

$$T_c[k] = \quad (8)$$

$$\begin{cases} (e[k+1] - 2h_1)^2, & e[1] > 0 \text{ and } k \text{ is odd}) \text{ or } (e[1] < 0 \text{ and } k \text{ is even}) \\ (e[k+1] + 2h_1)^2, & (e[1] < 0 \text{ and } k \text{ is odd}) \text{ or } (e[1] > 0 \text{ and } k \text{ is even}) \end{cases}$$

$$= (e[k+1] + s \cdot (-1)^k \cdot 2h_1)^2 = e^2[k+1] + 4 \cdot s \cdot (-1)^k \cdot e[k+1] \cdot h_1 + 4h_1^2$$

The term $2h_1$ represents an error caused by 1-tap DFE error propagation. The difference between the branch metrics $T_c[k]$ and $T_o[k]$ can be represented by a new branch metric T[k] calculated using the following formula.

$$T[k] = \frac{T_c[k] - T_o[k]}{4} = s \cdot (-1)^k \cdot e[k+1] \cdot h_1 + h_1^2, \text{ for } k = 1, 2, 3, \quad (9)$$

The comparison between a specific candidate path and a corresponding original path both having the same number of branches can be used to determine if the specific candidate path is a target path that can be selected as an error propagation path. Regarding path metric computation of each candidate path, the branch metrics H, P, T calculated using aforementioned formulas (3), (6), (9) can be used to obtain an equivalent path metric for simplification of the forward error propagation path tracking, as illustrated by the bottom part of FIG. 4. In other words, the path metrics PM[j] of candidate paths j={1, 2, . . . , k} can be expressed using the following formulas.

$$PM[1] = H + T[1] \quad (10)$$

$$PM[2] = H + P[2] + T[2] \quad (11)$$

$$PM[3] = H + P[2] + P[3] + T[3] \quad (12)$$

$$\vdots$$

$$PM[k] = H + P[2] + \ldots + P[k] + T[k] \quad (13)$$

Since forward error propagation path tracking is employed, the path metrics calculation & selection function 210 may calculate the path metrics PM[j] of candidate paths j={1, 2, . . . , k} sequentially. The propagation path ends when the first PM<0 is found. In some embodiments, the path metrics calculation & selection function 210 may check if the current path metric PM[i] is a negative value before calculating and checking the next path metric PM[i+1]. If the current path metric PM[i] is found smaller than zero, the candidate path with the path metric PM[i] is selected, and a propagation length P (P=i−1) is determined. It should be noted that when the first PM<0 found by the path metrics calculation & selection function 210 is the path metric PM[1], the propagation length P has a zero value (i.e., P=0) due to the fact that the suspicious error is a single error that is not propagated to the following symbol decision via feedback characteristic of DFE.

As mentioned above, the head error detection function 206 provides the sign s of the head error (i.e., s=sign(e[1])) to the error corrector 204. After the propagation length P is decided by the path metrics calculation & selection function 210, the error correction function 212 can refer to parameters, including sign(e[1]) and P, for identifying an error pattern that is caused by 1-tap DFE and starts from the detected head position, and then can perform error correct upon the symbol decision signal S_D according to the identified error pattern. For example, the error pattern caused by 1-tap DFE alternates in {−1, +1}. Considering a case where sign(e[1])=−1 and P=3, the error pattern caused by 1-tap DFE may be −1, +1, −1, +1. Considering another case where sign(e[1])=+1 and P=3, the error pattern caused by 1-tap DFE may be +1, −1, +1, −1.

Suppose that PAM4 symbol values −3, −1, 1, and 3 are indicated by using 0, 1, 2, and 3, respectively. In a case where 1+D precoding is not used, correction for symbol sequence $\{S_k\}$ ($S_0$ is the first false symbol of DFE error propagation, that is, the symbol affected by the head error) may be expressed using the following formula.

$$S_k = S_k - \text{sign}(e[1]) \times (-1)^k \text{ for } k=0:1:P \quad (14)$$

In another case where 1+D precoding is used, two symbols $S_0$ (which is the first false symbol at the beginning of error propagation) and $S_{P+1}$ (which is a symbol following the last false symbol at the end of error propagation) may be modified using the following formulas.

$$S_0 = \text{mod}(S_0 - \text{sign}(e[1]), 4) \quad (15)$$

$$S_{P+1} = \text{mod}(S_{P+1} + (-1)^P \times \text{sign}(e[1]), 4) \quad (16)$$

Figure 9:
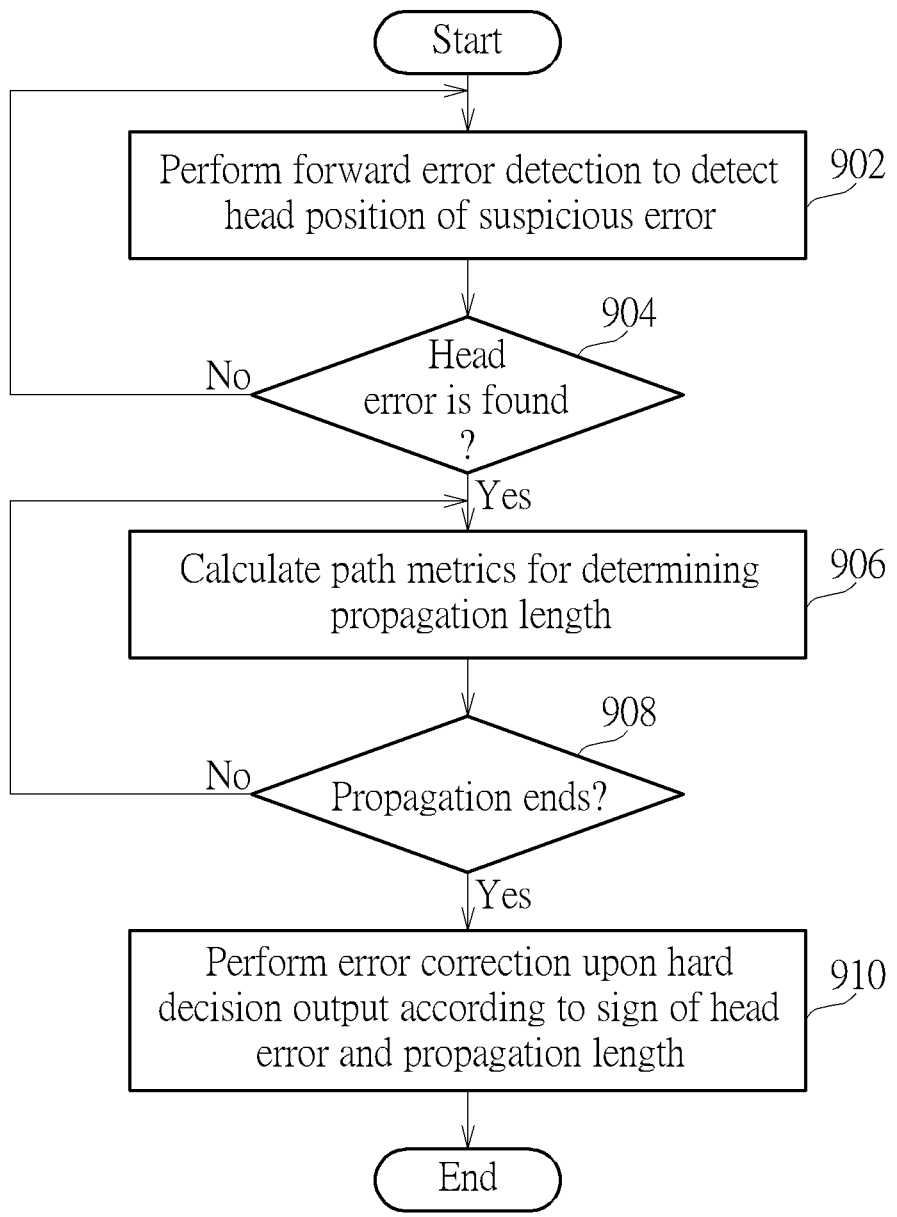
FIG. 9 is a flowchart illustrating an error detection and correction method according to an embodiment of the present invention.

FIG. 9 is a flowchart illustrating an error detection and correction method according to an embodiment of the present invention. The error detection and correction method may be employed by the TBEE 106/200. Provided that the result is substantially the same, the steps are required to be executed in the exact order shown in FIG. 9. At step 902, the error detection circuit 126/error detector 202 performs forward error detection to detect a head position of suspicious error, where the suspicious error may be a single error or a burst error. At step 904, the error detection circuit 126/error detector 202 determines if a head error at the head position is successfully found. If yes, the flow proceeds with step 906. Otherwise, the flow returns to step 902 to keep doing the forward error detection. At step 906, the error correction circuit 128/error corrector 204 calculates path metrics for determining a propagation length, where the propagation length may be a zero value if the suspicious error is a single error or a non-zero value if the suspicious error is a burst error. At step 908, the error correction circuit 128/error corrector 204 determines if the propagation ends. If yes, the flow proceeds with step 910. Otherwise, the flow returns to step 906 to keep doing path metric calculation. At step 910, the error correction circuit 128/error corrector 204 performs error correction upon the hard decision output according to sign of the head error and the propagation length. As a person skilled in the art can readily understand details of the steps shown in FIG. 9 after reading above paragraphs directed to principles of the TBEE 106/200, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An error detection and correction device comprising:
   a decision-feedback equalizer (DFE), configured to equalize a data signal to generate a first equalized signal;
   a decision circuit, configured to perform hard decision upon the first equalized signal to generate a symbol decision signal;
   an error detection circuit, configured to perform forward error detection at symbol positions of consecutive symbols included in the symbol decision signal to detect a head position of suspicious error that affects at least one symbol in the symbol decision signal; and
   an error correction circuit, configured to perform error correction upon the symbol decision signal in response to the head position of the suspicious error that is detected by the error detection circuit.

2. The error detection and correction device of claim 1, further comprising:
   a feed-forward equalizer (FFE), configured to process a received signal to generate a second equalized signal as the data signal.

3. The error detection and correction device of claim 1, wherein the suspicious error detected by the error detection circuit is a single error that affects only a single symbol included in the symbol decision signal.

4. The error detection and correction device of claim 1, wherein the suspicious error detected by the error detection circuit is a burst error that affects more than one symbol included in the symbol decision signal.

5. The error detection and correction device of claim 1, wherein the data signal is derived from a pulse amplitude modulation (PAM) signal.

6. The error detection and correction device of claim 5, wherein the consecutive symbols comprise a previous symbol at a previous symbol position and a current symbol at a current symbol position; the first equalized signal comprises a previous sample and a current sample, where the previous symbol is a hard decision result of the previous sample, and the current symbol is a hard decision result of the current sample; and the error detection circuit performs the forward error detection by checking if:
   an absolute difference between the previous sample and the previous symbol is not larger than a predetermined threshold;
   an absolute difference between the current sample and the current symbol is larger than the predetermined threshold; and
   an absolute value of the current sample is smaller than a maximum PAM level.

7. The error detection and correction device of claim 1, wherein the error correction circuit is configured to perform forward error propagation path tracking that starts from the head position detected by the error detection circuit, for selecting an error propagation path with a propagation length; and the error correction is performed according to at least the propagation length.

8. The error detection and correction device of claim 7, wherein the forward error propagation path tracking is performed based on a two-state trellis.

9. The error detection and correction device of claim 1, wherein the error detection circuit is further configured to control activation of the error correction circuit during the forward error detection.

10. The error detection and correction device of claim 9, wherein the error correction circuit is activated in response to the head position of the suspicious error being detected by the error detection circuit.

11. An error detection and correction method comprising:
performing decision-feedback equalization upon a data signal to generate a first equalized signal;
performing hard decision upon the first equalized signal to generate a symbol decision signal;
performing forward error detection at symbol positions of consecutive symbols included in the symbol decision signal to detect a head position of suspicious error that affects at least one symbol in the symbol decision signal; and
performing error correction upon the symbol decision signal in response to the head position of the suspicious error.

12. The error detection and correction method of claim 11, further comprising:
performing feed-forward equalization upon a received signal to generate a second equalized signal as the data signal.

13. The error detection and correction method of claim 11, wherein the suspicious error is a single error that affects only a single symbol included in the symbol decision signal.

14. The error detection and correction method of claim 11, wherein the suspicious error is a burst error that affects more than one symbol included in the symbol decision signal.

15. The error detection and correction method of claim 11, wherein the data signal is derived from a pulse amplitude modulation (PAM) signal.

16. The error detection and correction method of claim 15, wherein the consecutive symbols comprise a previous symbol at a previous symbol position and a current symbol at a current symbol position; the first equalized signal comprises a previous sample and a current sample, where the previous symbol is a hard decision result of the previous sample, and the current symbol is a hard decision result of the current sample; and performing the forward error detection comprises:
checking if:
an absolute difference between the previous sample and the previous symbol is not larger than a predetermined threshold;
an absolute difference between the current sample and the current symbol is larger than the predetermined threshold; and
an absolute value of the current sample is smaller than a maximum PAM level.

17. The error detection and correction method of claim 11, wherein performing the error correction comprises:
performing forward error propagation path tracking that starts from the head position, for selecting an error propagation path with a propagation length;
performing the error correction according to at least the propagation length.

18. The error detection and correction method of claim 17, wherein the forward error propagation path tracking is performed based on a two-state trellis.

19. The error detection and correction method of claim 11, wherein performing the forward error detection further comprises:
controlling activation of the error correction during the forward error detection.

20. The error detection and correction method of claim 19, wherein the error correction is activated in response to the head position of the suspicious error being detected by the forward error detection.

* * * * *